(No Model.)
E. MILLER.
DISK CULTIVATOR.
No. 499,844.  Patented June 20, 1893.
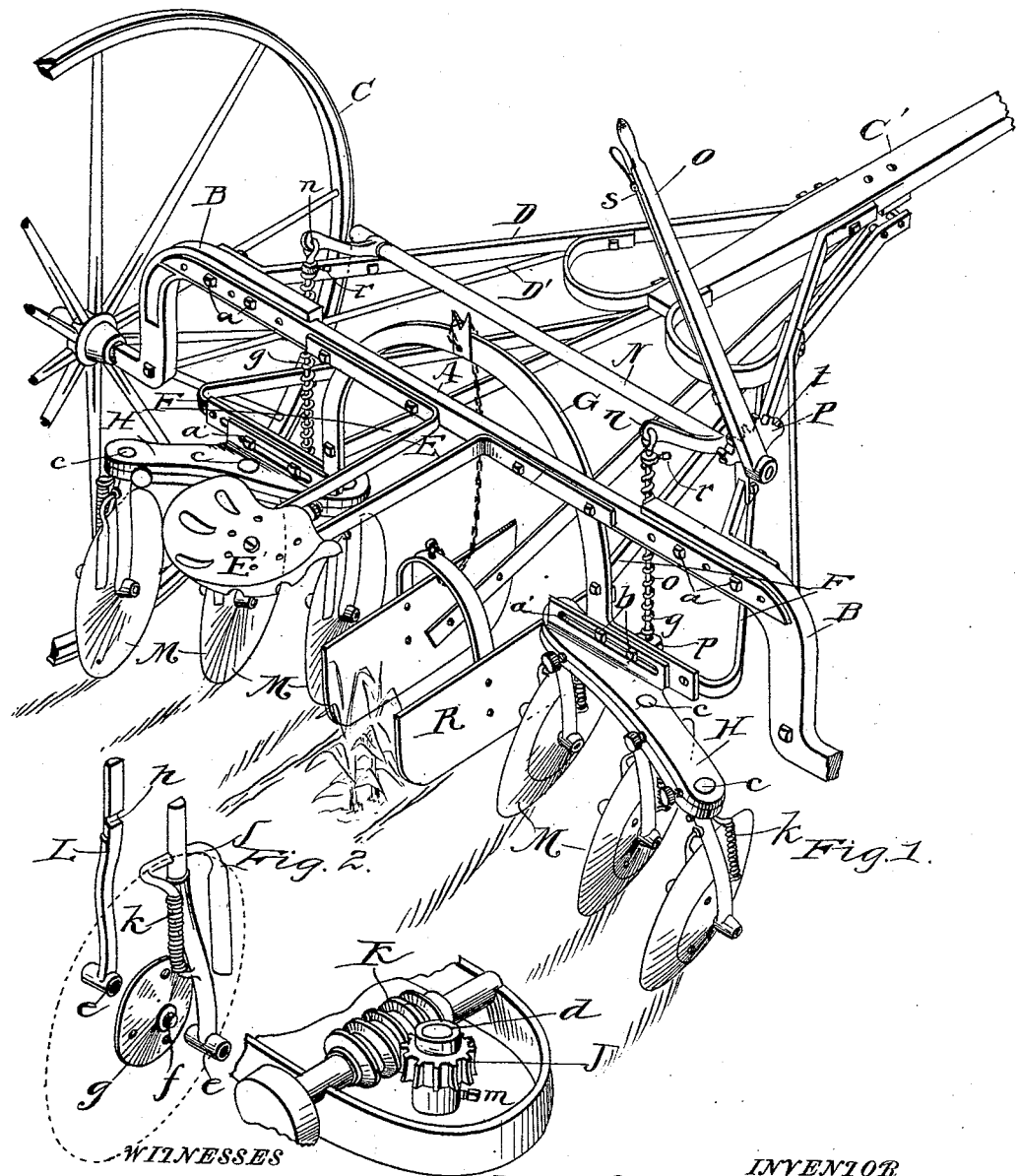
WITNESSES
E. G. Lane.
Burt B. Miller
INVENTOR
Eli Miller
By W. K. Miller
Attorney

UNITED STATES PATENT OFFICE.

ELI MILLER, OF MORGAN PARK, ILLINOIS.

DISK CULTIVATOR.

SPECIFICATION forming part of Letters Patent No. 499,844, dated June 20, 1893.

Application filed February 27, 1893. Serial No. 463,801. (No model.)

*To all whom it may concern:*

Be it known that I, ELI MILLER, a citizen of the United States, and a resident of Morgan Park, county of Cook, State of Illinois, have invented a new and useful Improvement in Disk Cultivators, of which the following is a full, clear and exact description, reference being had to the accompanying drawings, making part of this specification.

My invention relates to improvements in disk cultivators, the object of which is to provide means for adjusting the disks together or separately transverse or oblique to the line of draft and to raise and depress the disks during the progressive movement of the cultivator.

With these objects in view my invention relates to certain features of construction and combination of parts as will be hereinafter described and pointed out in the claims.

Figure 1, of the accompanying drawings is a perspective of a disk cultivator illustrating my invention, with the right hand wheel and spindle removed to show detail of construction. Fig. 2, is a similar view of a disk supporting shank and spindle; and Fig. 3, a similar view of a fragment of the disk supporting beam, showing the interior and the disk adjusting screw.

Referring to Fig. 1. A represents the supporting axle which is formed substantially as shown having a central arched or raised portion at the ends of which is provided spindle portions B, that are adjustably secured to the middle portion A, by bolts as $a$ the casting B, having provided therein a series of perforations indicated by the dotted lines to correspond with the bolts $a$, C representing the frame supporting wheels by which the height of the frame is determined. The draft pole C' is secured to the axle by hound pieces D and D'. At the rear of the axle A is provided a seat support E having adjustably secured thereon a driver's seat E'. The hereinbefore described parts constituting the supporting and controlling truck, to which the draw bars F are pivotally secured at their front ends to the tongue, the rear portions of said bars are spaced apart and held in position by the arched connecting bar G.

At the rear portion of the draw bars F is provided and adjustably secured thereto, a hollow beam H in form substantially as shown having an elongated aperture $a'$, through which the bolts $b$ are passed to secure the beam to the draw bar, thus adapting the beam for adjustment transverse the line of draft. For the purpose of convenience in construction and the further purpose of securing the parts from violence and dirt, the beam is made hollow and in two parts as shown. Vertically through the beam is provided a series of apertures $c$ in which is journaled the cylindrical hub portions $d$ of the worm wheel J. To rotate, adjust and secure said worm wheel in desired adjustment a screw or threaded shaft K commonly termed a worm is journaled in the sides of the beam as shown in Fig. 3.

The disk supporting shank L is formed of two parts as shown in Fig. 2, at the lower end portions of which are formed journal boxes $e$ to embrace the spindles $f$ on the disk plates $g$, to which the disk M is secured. The upper end portions of the shanks L are semi-circle or half round in cross section, and have therein a groove $h$ transverse the shank in which is journaled a disk scraper $j$ which is held against the side of the disk M by the coil spring $k$ as shown in Figs. 1 and 2.

The lower end or prongs of the shank L embracing the disk M, is passed into the hub or sleeve portion of the worm wheel J, and secured therein by the set screw $m$.

To raise or depress the disks, a rock shaft N is journaled to the hounds D, having rearwardly projected arms $n$ from which links $o$ depend, the lower end of which passes through lugs $p$ that project forwardly from the rear portion of the draw bars F, a nut or pin to take under said lug to prevent the withdrawal of the link, on which the beam and disks may be raised by the hand lever O. About the link $o$ is placed a coiled spring $g$ the lower end resting on the lug $p$, the upper end to take under a collar $r$ that is adjustably secured on the link and may be moved thereon to increase or decrease the tension of the spring by which the disks may be depressed by the resistance or downwardly exerted energy of the spring. The pressure may be further regulated by the lever which may be adjusted about the toothed quadrant P, the pawl $s$ to engage the teeth t. The shields R are of th usual form and may be connected to the tongue or to the hounds.

The distinctive features of my invention are, the extensible axle, the individual adjustment of the disks, and the automatic yielding compress by which the disks are held to the ground.

In operation the beams with disks may be moved to or from the central line of draft to carry the disks to or from the corn or other vegetable by the use of the elongated aperture $a'$, and the bolts $b$. The disks M, may be adjusted individually by turning the worm K so as to move the ground to or from the corn or a part of them may be set to move the ground to the corn and the others from it. The operator having absolute control of each disk may so adjust it by the worm and worm wheel to move the ground as he may desire in the process of cultivation. The operator in the seat E' his feet resting on the inner end portion of the beams may move them to the right or to the left, and may reach the hand portion of the worm K, to adjust the disks during the progressive movement of the machine. To raise the disks from the ground, the hand lever O, may be thrown forward and to depress them, the lever will be turned back and down.

Having thus fully described the nature and object of my invention, what I claim as new, and desire to secure by Letters Patent, is—

1. The combination with a supporting and controlling truck, of a supplemental frame or draft device pivotally secured to said truck at one of its ends, said draft device having at its free end, and pivotally secured thereto, a series of revolving disks, and means for adjusting said disks individually about their pivotal connection with said draft device, substantially as described and for the purpose set forth.

2. The combination with the supporting and controlling truck, of the draw bar F, having its front end pivotally secured to said truck, a beam H, adjustably secured to the free end of said bar, said beam having pivotally secured thereto a series of revolving disks that may be adjusted about their pivotal connection with the beam, substantially as described and for the purpose set forth.

3. The combination with a controlling and supporting truck, of a draft device pivotally secured thereto, a plurality of revolving disks, pivotally secured to the free end of said draft device and a worm and worm wheel, whereby said disks may be adjusted about their pivotal connection with said draft device, substantially as described and for the purpose set forth.

4. The combination with the beam H, and disk M, of the divided shank L, scraper $j$ and spring $k$, substantially as described and for the purpose set forth.

5. The combination with the supporting wheels and axle of hounds D, the draft bar F, beam H, and revolving disks of the rock shaft N, journaled to said hounds, and having rearwardly projected arms $n$, having a link connection with the draw bar, spring $q$, quadrant P, and hand lever O, substantially as described and for the purpose set forth.

6. The combination with a supporting or controlling truck of the draw bar F, a hollow beam secured thereto, having pivotally secured thereto, a series of revolving disks, and therein a worm and wheel whereby said disks may be adjusted about their pivotal connection with the beams, for the purpose set forth.

In testimony whereof I have hereunto set my hand this 1st day of February, A. D. 1893.

ELI MILLER.

Witnesses:
W. K. MILLER,
BURT. A. MILLER.